US011327318B2

(12) United States Patent
Lin

(10) Patent No.: US 11,327,318 B2
(45) Date of Patent: May 10, 2022

(54) HEAD-MOUNTED DISPLAY

(71) Applicant: HTC Corporation, Taoyuan (TW)

(72) Inventor: Yung-Chen Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/992,118

(22) Filed: Aug. 13, 2020

(65) Prior Publication Data

US 2021/0048675 A1 Feb. 18, 2021

Related U.S. Application Data

(60) Provisional application No. 62/885,827, filed on Aug. 13, 2019.

(51) Int. Cl.
*G06F 3/01* (2006.01)
*G02B 27/01* (2006.01)

(52) U.S. Cl.
CPC ......... *G02B 27/0172* (2013.01); *G06F 3/013* (2013.01)

(58) Field of Classification Search
CPC .......... G06F 3/013; G06F 3/012; G06F 3/017; G06F 3/011; G06F 3/04815; G06F 3/167; G06F 3/015; G06F 1/163; G06F 3/01
See application file for complete search history.

(56) References Cited

U.S. PATENT DOCUMENTS

| | | | |
|---|---|---|---|
| 4,145,122 A * | 3/1979 | Rinard | A61F 4/00 351/158 |
| 4,848,340 A * | 7/1989 | Bille | A61B 3/113 606/4 |
| 5,070,883 A * | 12/1991 | Kasahara | F41G 3/225 600/558 |
| 9,208,566 B2 * | 12/2015 | Chen | G06F 3/0346 |
| 9,529,192 B2 * | 12/2016 | Border | G06F 3/005 |
| 9,532,714 B2 * | 1/2017 | Border | G06F 3/013 |
| 10,466,491 B2 * | 11/2019 | Osterhout | G02B 27/0176 |
| 10,725,537 B2 * | 7/2020 | Iseringhausen | G02B 27/0172 |
| D918,905 S * | 5/2021 | Osterhout | D14/372 |
| 2010/0220291 A1 * | 9/2010 | Horning | G02B 27/017 351/210 |

(Continued)

OTHER PUBLICATIONS

Office Action of China Counterpart Application, dated Feb. 9, 2022, pp. 1-7.

*Primary Examiner* — Olga V Merkoulova
(74) *Attorney, Agent, or Firm* — JCIPRNET

(57) ABSTRACT

The disclosure provides a head-mounted display (HMD) including a chamber a light emitter, a camera, and a processor. The chamber has a lens and a display, wherein the lens is coated with a reflective layer and faces a target eye of a wearer, and the reflective layer has at least one specific location. The light emitter emits a first light to the reflective layer, wherein for an i-th specific location, the first light is scattered as multiple second lights by the i-th specific location, the second lights are scattered as multiple third lights by the target eye, and the third lights are scattered as multiple fourth lights by multiple reference locations on the reflective layer. The camera captures the fourth lights as an image corresponding to the i-th specific location. The processor estimates an eye pose of the target eye based on the image corresponding to each specific location.

15 Claims, 4 Drawing Sheets

(56) References Cited

U.S. PATENT DOCUMENTS

| | | | |
|---|---|---|---|
| 2011/0157553 A1* | 6/2011 | Moeller | A61B 3/13 |
| | | | 351/210 |
| 2013/0176533 A1* | 7/2013 | Raffle | G06K 9/00604 |
| | | | 351/209 |
| 2015/0193920 A1* | 7/2015 | Knee | H04N 5/23229 |
| | | | 382/154 |
| 2016/0366399 A1* | 12/2016 | Tempel | H04N 13/344 |
| 2017/0031435 A1* | 2/2017 | Raffle | G02B 27/0172 |
| 2017/0123526 A1* | 5/2017 | Trail | A61B 3/113 |
| 2017/0131765 A1 | 5/2017 | Perek et al. | |
| 2019/0101978 A1* | 4/2019 | Iseringhausen | G06F 3/011 |
| 2019/0130639 A1* | 5/2019 | Boyce | G06T 7/20 |
| 2021/0048675 A1* | 2/2021 | Lin | G02B 27/017 |

* cited by examiner

HEAD-MOUNTED DISPLAY

CROSS-REFERENCE TO RELATED APPLICATION

This application claims the priority benefit of U.S. provisional application Ser. No. 62/885,827, filed on Aug. 13, 2019. The entirety of the above-mentioned patent application is hereby incorporated by reference herein and made a part of this specification.

BACKGROUND OF THE INVENTION

1. Field of the Invention

The present invention generally relates to a device for obtaining an eye pose, in particular, to a head-mounted display (HMD) capable of obtaining an eye pose of the wearer.

2. Description of Related Art

See FIG. 1A, which shows a conventional eye tracking mechanism. In FIG. 1A, since the trend of the aperture of the virtual reality (VR) lens 102 is getting larger and larger for the user's immersive perception, the position of the camera 106 of the direct-view type eye tracker at the boundary of the lens 102 is getting more and more difficult to capture the eye feature (e.g., the pupil) when the target eye 199 is in some specific eye rotation angles. For example, when the display 104 of the chamber 100 (which may be referred to as a VR tube) of the HMD worn by the wearer is showing a visual content that has some objects around the upper boundary of the visual content, the target eye 199 of the wearer may attempt to look at those objects. In this case, the target eye 199 may rotate upward such that the camera 106 disposed near the lower boundary of the lens 102 cannot retrieve eye images with pupils, and hence the related eye tracking mechanism cannot be properly performed.

See FIG. 1B, which shows a hot-mirror type eye tracking mechanism. In FIG. 1B, the camera 106 for capturing eye images of the target eye 199 is disposed inside of the chamber 100a, wherein the chamber 100a is further disposed with a mirror 108 that is only capable of reflecting infrared (IR) lights. In this case, the HMD may be disposed with an IR illuminator for illuminating the target eye 199 with IR lights, such that the target eye 199 may reflect the IR lights to the mirror 108. As the mirror 108 receives the IR lights reflected by the target eye 199, the mirror 108 would further reflect the received IR lights to the camera 106a for the camera 106a to capture eye images of the target eye 199, such that the subsequent eye tracking mechanism may be performed.

However, with the trend of the thickness of the chamber 100a (i.e., the VR tube) is getting thinner (i.e., the distance between the lens 102 and the display 104 is getting shorter), the mirror 108 would be more and more closer to the display 104, and hence the visibility of the camera 106a is also getting smaller and smaller.

SUMMARY OF THE INVENTION

Accordingly, the present disclosure is directed to an HMD that could solve the above technical problems.

In one embodiment, the disclosure provides a head-mounted display (HMD) including a chamber a light emitter, a camera, and a processor. The chamber is disposed with a lens and a display, wherein the lens has a first surface and a second surface, the first surface faces the display, the second surface is coated with a reflective layer and faces a target eye of a wearer, and the reflective layer has at least one specific location. The light emitter is located outside of the chamber and emits a first light to each specific location on the reflective layer, wherein for an i-th specific location of the at least one specific location, the first light is scattered as a plurality of second lights by the i-th specific location, the second lights are scattered as a plurality of third lights by the target eye, and the third lights are scattered as a plurality of fourth lights by a plurality of reference locations on the reflective layer. The camera is located outside of the chamber and captures the fourth lights as an image corresponding to the i-th specific location. The processor is coupled with the light emitter and the camera and estimates an eye pose of the target eye based on the image corresponding to each specific location.

In another embodiment, the disclosure provides a head-mounted display (HMD) including a chamber, a reference light source, at least one light emitter, a camera, and a processor. The chamber is disposed with a lens and a display, wherein the lens has a first surface and a second surface, the first surface faces the display, and the second surface is coated with a reflective layer and faces a target eye of a wearer. The reference light source is located outside of the chamber and emits a reference light to the reflective layer. The at least one light emitter is located outside of the chamber and sequentially emits a first light to the target eye, wherein for an j-th light emitter of the at least one light emitter, the target eye scatters the first light corresponding to the j-th light emitter as a plurality of second lights to the reflective layer, the first light corresponding to each light emitter is temporally coherent to the reference light, and the second lights corresponding to the j-th light emitter interferes with the reference light as an interference pattern corresponding to the j-th light emitter. The camera is located outside of the chamber and captures the interference pattern corresponding to each light emitter. The processor is coupled with the reference light source, the at least on light emitter, and the camera and estimates an eye pose of the target eye based on the interference pattern corresponding to each light emitter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
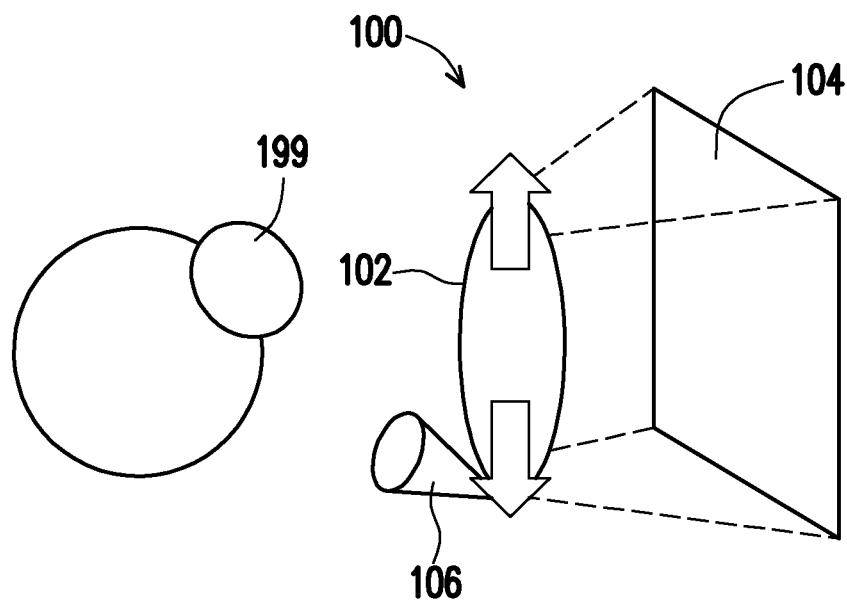
FIG. 1A shows a conventional eye tracking mechanism.
Figure 1B:
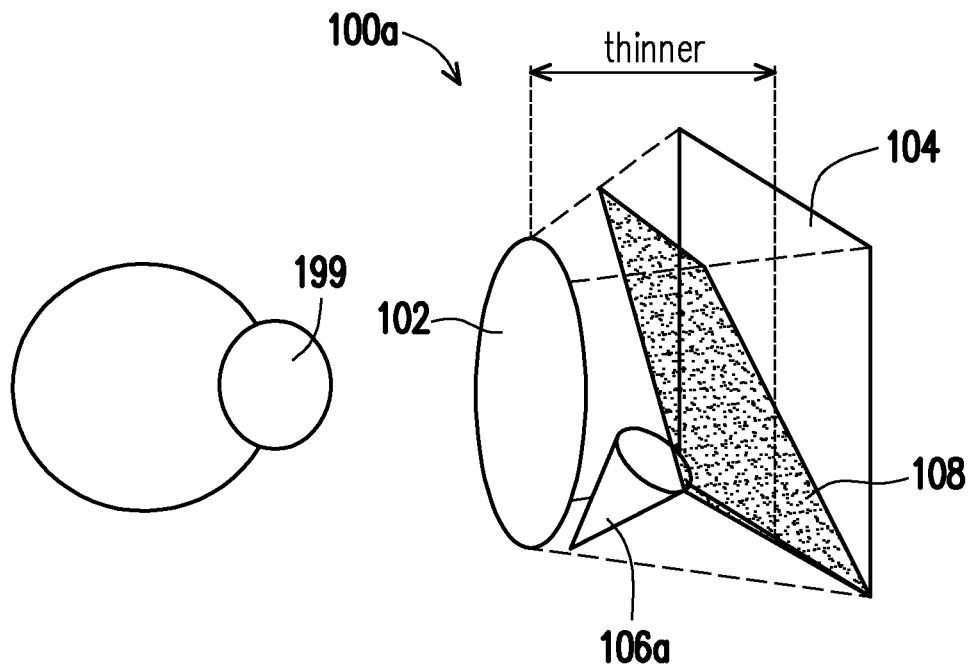
FIG. 1B shows a hot-mirror type eye tracking mechanism.

Reference will now be made in detail to the present preferred embodiments of the invention, examples of which are illustrated in the accompanying drawings. Wherever possible, the same reference numbers are used in the drawings and the description to refer to the same or like parts.

Figure 2:
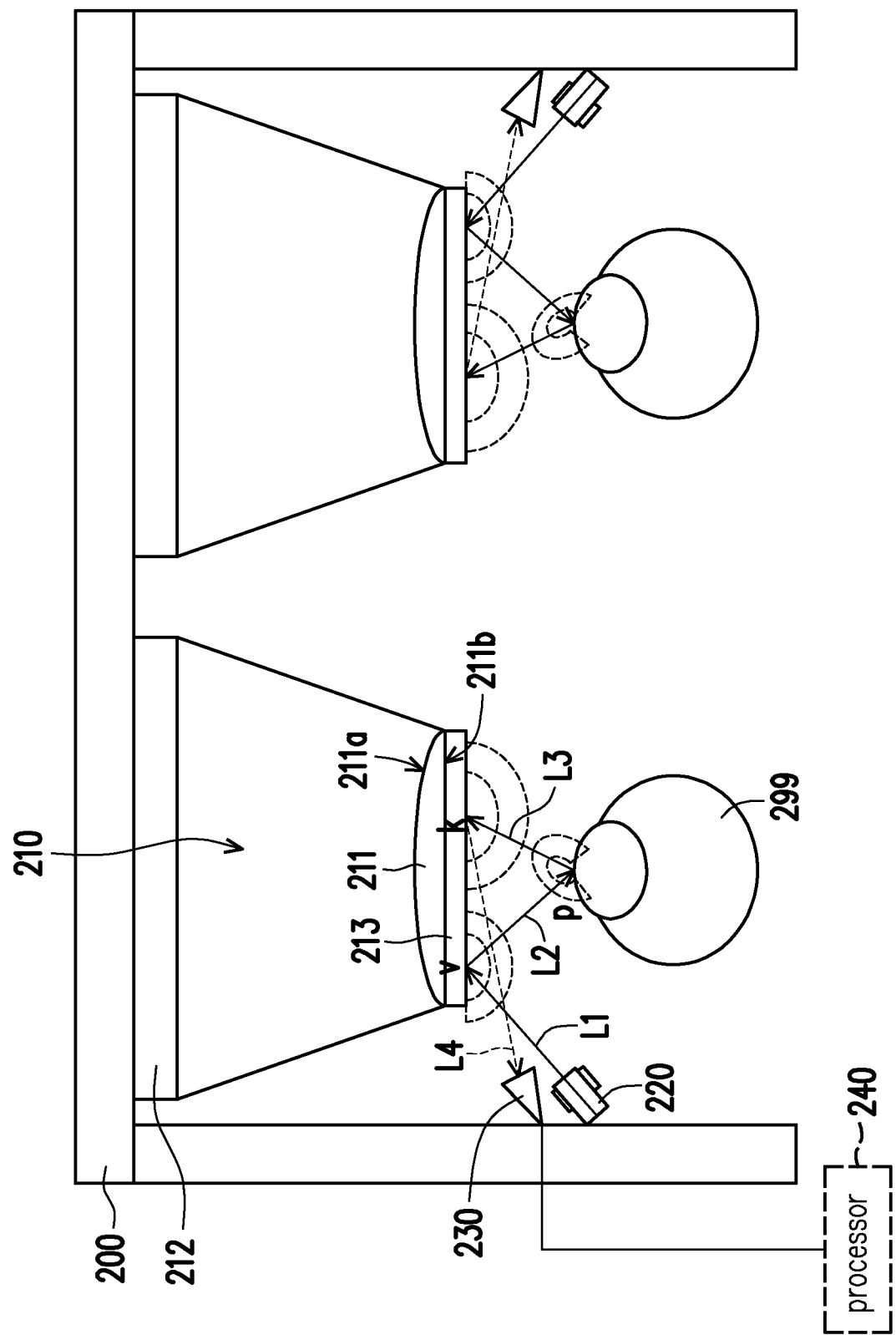
FIG. 2 shows a schematic view of an HMD according to a first embodiment of the disclosure.

See FIG. 2, which shows a schematic view of an HMD according to a first embodiment of the disclosure. In FIG. 2, the HMD 200 includes a chamber 210, a light emitter 220, a camera 230, and a processor 240. The chamber 210 is disposed with a lens 211 and a display 212, wherein the lens 211 has a first surface 211a and a second surface 211b.

In one embodiment, the display 212 may be used to provide a visual content (e.g., VR contents), and the visual content may be propagated through the lens 211 to a target eye 299 of a wearer of the HMD 200. That is, the target eye 299 may see the visual content through the lens 211.

In one embodiment of the disclosure, the first surface 211a faces the display 212, the second surface 211b is coated with a reflective layer 213 and faces the target eye 299.

The light emitter 220 is located outside of the chamber 210 and emits a first light L1 to the reflective layer 213. In one embodiment, the reflective layer 213 may have at least one specific location, and the light emitter 220 may be designed to emit the first light L1 to each specific location on the reflective layer 213.

From another perspective, FIG. 2 may be regarded as showing the situation of the light emitter 220 emitting the first light L1 to one specific location (denoted as v) on the reflective layer 213, but the disclosure is not limited thereto.

In one embodiment, the reflective layer 213 may include N specific locations and a plurality of reference locations. In one embodiment, the N specific locations may be respectively denoted as v1, v2, . . . , vN, and the specific location v in FIG. 2 may be understood as one of the N specific locations, but the disclosure is not limited thereto. In addition, the reference location k in FIG. 2 may be understood as one of the reference locations, but the disclosure is not limited thereto.

In one embodiment, the first light L1 may be a non-visible and narrowband light (e.g., an IR light) that has a wavelength distribution, and the reflective layer 213 may be designed to only scatter lights with a specific wavelength within the wavelength distribution, e.g., the first light L1.

In one embodiment, after the first light L1 reaches an i-th ($1 \le i \le N$) specific location (e.g., the specific location v) on the reflective layer 213, the first light L1 is scattered as a plurality of second lights by the i-th specific location, the second lights are scattered as a plurality of third lights by the target eye 299, and the third lights are scattered as a plurality of fourth lights by the reference locations on the reflective layer 213.

Taking FIG. 2 as an example, the first light L1 may be regarded as being scattered as a plurality of second lights L2 (wherein only one of the second lights L2 is shown in FIG. 2 for brevity) by the specific location v on the reflective layer 213. The second lights L2 corresponding to the specific location v may be regarded as being scattered as a plurality of third lights L3 (wherein only one of the third lights L3 is shown in FIG. 2 for brevity) by a plurality of eye locations p (wherein only one of the eye locations p is shown in FIG. 2 for brevity) on the target eye 299. The third lights L3 corresponding to the specific location v may be regarded as being scattered as a plurality of fourth lights L4 (wherein only one of the fourth lights L4 is shown in FIG. 2 for brevity) corresponding to the specific location v by the reference locations on the reflective layer 213, but the disclosure is not limited thereto.

In one embodiment, the radiance generated by the third lights L3 at the reference location k may be modeled as:

$$L\{k\} \sim \int_p f(p-v, k-p) L(v) \cos(p-v, n_x) \frac{dS_p}{r_{pv}^2},$$

wherein f represents the bidirectional reflectance distribution function (BRDF) at the point p, L(v) is the radiance at the point v, L(k) is the radiance at the reference location k, $n_x$ is the surface normal of the incident surface at p, $dS_p$ is the differential surface element near the point p, $r_{pv}$ is the distance from the specific location v to the eye location p, and the BRDF at the eye location p encoded the information of the target eye 299. Details of the above formula of L(k) may be referred to "W. Chen, S. Daneau, C. Brosseau and F. Heide, "Steady-State Non-Line-Of-Sight Imaging," 2019 *IEEE/CVF Conference on Computer Vision and Pattern Recognition (CVPR)*, Long Beach, Calif., USA, 2019, pp. 6783-6792, doi: 10.1109/CVPR.2019.00695" (referred to as "Document D1" hereinafter), which would not be repeated herein.

In one embodiment, the camera 230 may be located outside of the chamber 210 and only capable of detecting lights with the specific wavelength (e.g., the fourth lights L4). In this case, the camera 230 may capture the fourth lights L4 as an image corresponding to the specific location v.

In one embodiment, the radiance on a pixel q at the image corresponding to the specific location v may be modeled as:

$$b(q) \sim \int_\omega \Omega \int_k K \int_t T L(k) \cos(n_k, k-c) dk d\Omega_q dt$$

and the details thereof may be also referred to the Document D1, which would not be repeated herein.

Based on similar principle, the camera 230 may capture the image corresponding to each of the specific locations. That is, the camera 230 may capture N images (represented as $I_{v1}, I_{v2}, \ldots, I_{vN}$) respectively corresponding to the N specific locations (i.e., v1-vN), but the disclosure is not limited thereto.

Next, the processor 240 coupled with the light emitter 220 and the camera 230 may estimate an eye pose of the target eye 299 based on the image corresponding to each specific location. That is, the processor 240 may estimate the eye pose of the target eye 299 based on the N images (i.e., $I_{v1}, I_{v2}, \ldots, I_{vN}$).

In one embodiment, the processor 240 may input the image corresponding to each specific location to a feature extracting model. That is, the processor 240 may input $I_{v1}, I_{v2}, \ldots, I_{vN}$ to the feature extracting model. Correspondingly, the feature extracting model may extract a plurality of 3D eye features of the target eye 299 from the image corresponding to each specific location.

In one embodiment, $I_{v1}, I_{v2}, \ldots, I_{vN}$ may be understood as a series of encoded images of the target eye 299 from different incident rays on the specific location v. In this case, the feature extracting model may include an encoder-decoder convolutional neural network which was trained to learn to predict the 3D eye features within the target eye 299 from $I_{v1}, I_{v2}, \ldots, I_{vN}$ (i.e., the encoded images), but the disclosure is not limited thereto.

In one embodiment, the 3D eye features extracted from the series of the radiance images may be characterized as a tensor, and the dimension of the (output) tensor characterizing the 3D eye feature extracted from $I_{v1}, I_{v2}, \ldots, I_{vN}$ may be W×H×C, wherein W may be the width of $I_{v1}$ and H may be the height of $I_{v1}$. In one embodiment, C may be a predetermined number of the feature index, which may be also regarded as the number of channels of the output tensor.

That is, the tensor may be regarded as including C channels, wherein the channels one-to-one correspond to the 3D eye feature, and each channel is a W×H matrix. In one embodiment, the i-th channel indicates the depth map corresponding i-th eye feature, wherein the value of this matrix element of in the channel indicates the depth step in a defined range.

Next, the processor 240 may obtain the eye pose of the target eye 299 based on the 3D eye features and 3D to 2D matching technique like PNP . . . etc. In one embodiment, the processor 240 may reconstruct the 3D eye structure of the target eye 299 based on the 3D eye features, and the processor 240 may use a pose estimator to estimate the eye pose of the target eye 299 based on the reconstructed 3D eye structure. In some embodiments, the pose estimator may be pre-trained to output an estimated eye pose based on the reconstructed eye structure, but the disclosure is not limited thereto.

In one embodiment, the processor 240 may further obtain a gaze direction of the target eye 299 based on the eye pose of the target eye 299, such that the eye tracking mechanism may be properly performed.

In addition, the HMD 200 may include another chamber as shown in FIG. 2, in which the teachings in the above may be used to obtain the eye pose of the other target eye of the wearer, and the details would not be repeated herein.

Figure 3A:
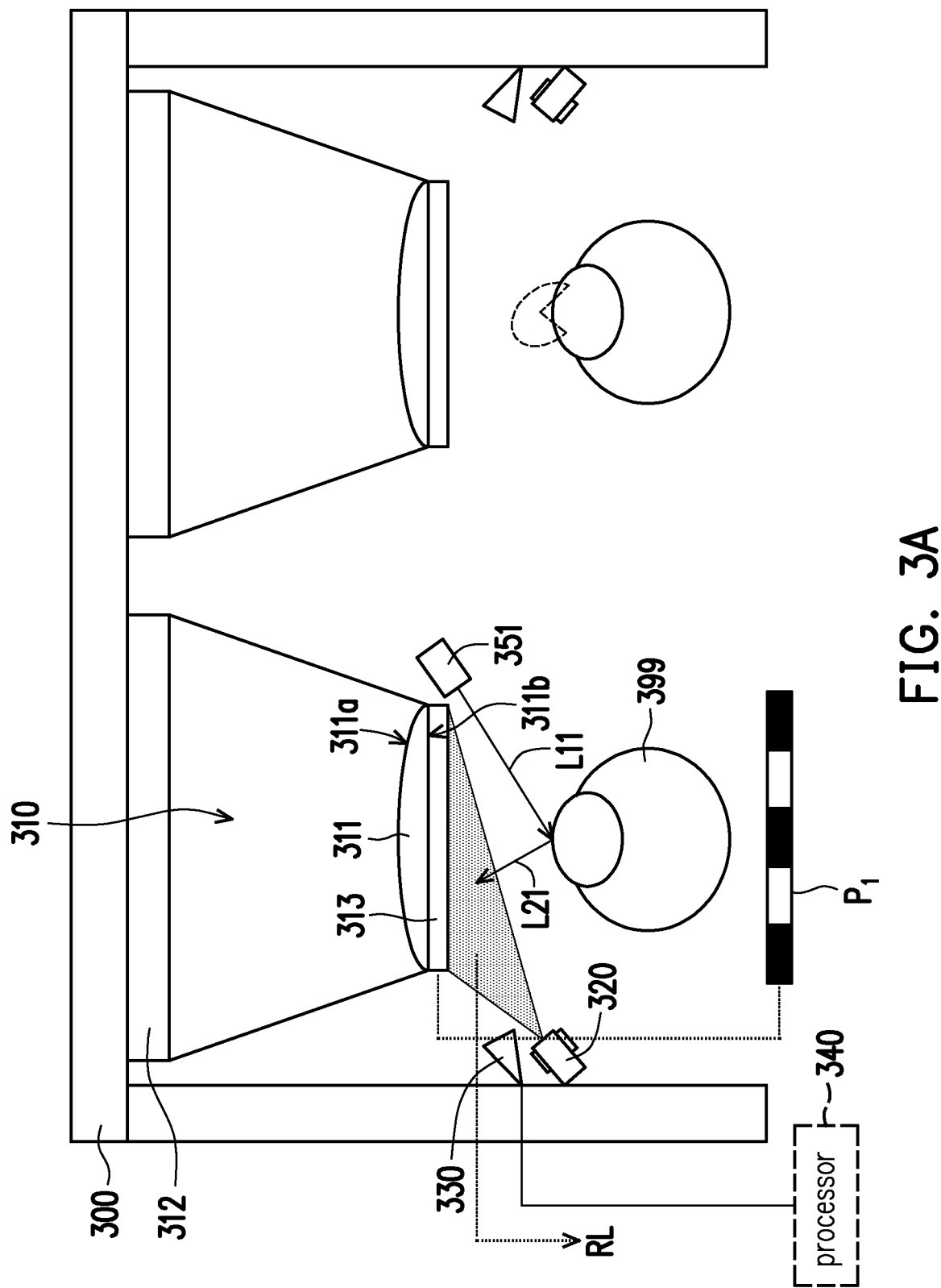
FIG. 3A is a schematic view of an HMD according to a second embodiment of the disclosure.
Figure 3B:
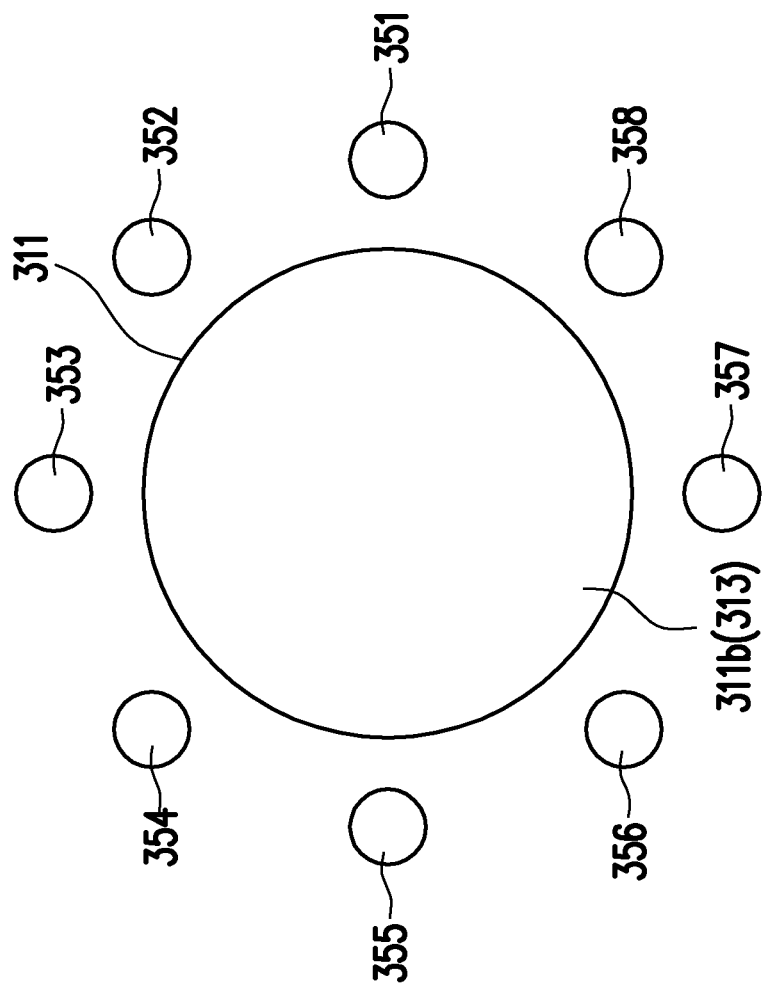
FIG. 3B is a front view of the chamber in FIG. 3A.

See FIG. 3A and FIG. 3B, wherein FIG. 3A is a schematic view of an HMD according to a second embodiment of the disclosure, and FIG. 3B is a front view of the chamber in FIG. 3A. In the second embodiment, the HMD 300 includes a chamber 300, a reference light source 320, light emitters 351-358, a camera 330, and a processor 340. Similar to the structure in FIG. 2, the chamber 310 is disposed with a lens 311 and a display 312, wherein the lens 311 has a first surface 311a and a second surface 311b. The first surface 311a faces the display 312, and the second surface 311b is coated with a reflective layer 313 and faces a target eye 399 of a wearer of the HMD 300.

The reference light source 320 is located outside of the chamber 310 and emits a reference light RL to the reflective layer 313. In one embodiment, the reference light RL may be an IR light, but the disclosure is not limited thereto.

The light emitters 351-358 are located outside of the chamber 310 and sequentially emits a first light L11 to the target eye 399, wherein the first light L11 corresponding to each light emitter 351-358 is temporally coherent to the reference light RL. In one embodiment, the first light L11 may be a non-visible and narrowband light (e.g., an IR light) that has a wavelength distribution, and the reflective layer 313 may be designed to only scatter lights with a specific wavelength within the wavelength distribution, e.g., the first light L11.

In FIG. 3B, the light emitters 351-358 may be disposed around the lens 313, but the disclosure is not limited thereto. In other embodiment, the number and the position of each light emitter may be adjusted based on the requirements of the designer. For example, the number of the light emitters may be more or less, and the position of each light emitter may be varied as long as the first light L11 emitted by each light emitter may reach the target eye 399, but the disclosure is not limited thereto. It should be noted that only the light emitter 351 is shown in FIG. 3A for simplifying the illustration, but the disclosure is not limited thereto.

In one embodiment, for an j-th (wherein j ranges between 1 and the total number of the light emitters 351-358) light emitter, the target eye 399 may scatter the first light corresponding to the j-th light emitter as a plurality of second lights to the reflective layer 313. For example, in FIG. 3A, the target eye 399 may scatter the first light L11 corresponding to the light emitter 351 as the second lights L21 (wherein only one of the second lights L21 is shown in FIG. 3A for brevity) to the reflective layer 313. For other light emitters 352-358, the first light L11 corresponding thereto would be scattered by the target eye 399 to the reflective layer 313 as well.

In this case, the second lights corresponding to each light emitter 351-358 would interfere with the reference light RL as an interference pattern corresponding to each light emitter 351-358. For example, in FIG. 3A, the second lights L21 corresponding to the light emitter 351 would interfere with the reference light RL as an interference pattern $P_1$ corresponding to the light emitter 351. Therefore, after the light emitters 351-358 sequentially emits the first light L11, there would be eight (i.e., the number of the light emitters 351-358) interference patterns (referred to as $P_1$-$P_8$) that could be observed on the reflective layer 313.

Next, the camera 330 may be located outside of the chamber 310 and only capable of detecting lights with the specific wavelength. In this case, the camera 330 may capture the interference pattern corresponding to each light emitter 351-358. That is, in the scenario of FIG. 3A and FIG. 3B, the camera 330 may capture $P_1$-$P_8$.

Afterwards, the processor 340 coupled with the reference light source 320, the light emitter 351-358, and the camera 330 may estimate an eye pose of the target eye 399 based on the interference pattern corresponding to each light emitter 351-358. That is, the processor 340 may estimate an eye pose of the target eye 399 based on $P_1$-$P_8$.

In one embodiment, the processor 340 may input the interference pattern corresponding to each light emitter 351-358 to a feature extracting model. That is, the processor 340 may input $P_1$-$P_8$ to the feature extracting model. Correspondingly, the feature extracting model may extract a plurality of 3D eye features of the target eye 399 from the interference pattern corresponding to each light emitter 351-358.

In one embodiment, $P_1$-$P_8$ may be understood as encoded multi-view images of the target eye 399. In this case, the feature extracting model may include an encoder-decoder convolutional neural network pre-trained to learn to extract the 3D eye features within the target eye 399 from $P_1$-$P_8$ (i.e., the encoded multi-view images), but the disclosure is not limited thereto. In one embodiment, the 3D eye features extracted from one of the interference pattern may be characterized as a tensor, and the details thereof may be referred to the teachings in the first embodiment, which would not be repeated herein.

Next, the processor 340 may obtain the eye pose of the target eye 399 based on the 3D eye features. In one embodiment, the processor 340 may reconstruct the 3D eye structure of the target eye 399 based on the input interference images, and the processor 340 may use a pose estimator to estimate the eye pose of the target eye 399 based on the reconstructed 3D eye structure. In some embodiments, the pose estimator may be pre-trained to output an estimated eye pose based on the reconstructed eye structure, but the disclosure is not limited thereto.

In one embodiment, the processor 340 may further obtain a gaze direction of the target eye 399 based on the eye pose of the target eye 399, such that the eye tracking mechanism may be properly performed.

In addition, the HMD 300 may include another chamber as shown in FIG. 3A, in which the teachings in the above may be used to obtain the eye pose of the other target eye of the wearer, and the details would not be repeated herein.

In summary, the disclosure provides two HMD structures in which a reflective layer is coated on the lens surface facing the target eye of the wearer. Under the situation, when the lights emitted by the light emitters reaches the target eye, the information of the target eye may be encoded into the lights reflected or scattered by the target eye, and hence the eye pose of the target eye may be obtained accordingly. Therefore, the two proposed HMD structures may be used to perform the eye tracking mechanisms in a novel way, such that the eye tracking mechanisms would not be limited by the chamber with small thickness or limited by the situation where the target eye performs extreme rotations (e.g., looking at the objects at the boundary of the visual content).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A head-mounted display (HMD), comprising:
    a chamber, disposed with a lens and a display, wherein the lens has a first surface and a second surface, the first surface faces the display, the second surface is coated with a reflective layer and faces a target eye of a wearer, and the reflective layer has at least one specific location;
    a light emitter, located outside of the chamber and emitting a first light to each specific location on the reflective layer, wherein for an i-th specific location of the at least one specific location, the first light is scattered as a plurality of second lights by the i-th specific location, the second lights are scattered as a plurality of third lights by the target eye, and the third lights are scattered as a plurality of fourth lights by a plurality of reference locations on the reflective layer;
    a camera, located outside of the chamber and capturing the fourth lights as an image corresponding to the i-th specific location; and
    a processor, coupled with the light emitter and the camera and estimating an eye pose of the target eye based on the image corresponding to each specific location.

2. The HMD according to claim 1, wherein the display is used to provide a visual content, wherein the visual content is propagated through the lens to the target eye.

3. The HMD according to claim 1, wherein the first light is a narrowband light having a wavelength distribution, the reflective layer only scatters lights with a specific wavelength within the wavelength distribution, and the camera only captures lights with the specific wavelength.

4. The HMD according to claim 1, wherein the processor is configured to:
    input the image corresponding to each specific location to a feature extracting model, wherein the feature extracting model extracts a plurality of 3D eye features of the target eye from the image corresponding to each specific location; and
    obtaining the eye pose of the target eye based on the 3D eye features.

5. The HMD according to claim 4, wherein the feature extracting model comprises an encoder-decoder convolutional neural network.

6. The HMD according to claim 1, wherein the first light is a non-visible light.

7. The HMD according to claim 1, wherein the processor further obtains a gaze direction of the target eye based on the eye pose of the target eye.

8. A head-mounted display (HMD), comprising:
    a chamber, disposed with a lens and a display, wherein the lens has a first surface and a second surface, the first surface faces the display, and the second surface is coated with a reflective layer and faces a target eye of a wearer;
    a reference light source, located outside of the chamber and emitting a reference light to the reflective layer;
    at least one light emitter, located outside of the chamber and sequentially emitting a first light to the target eye, wherein for an j-th light emitter of the at least one light emitter, the target eye scatters the first light corresponding to the j-th light emitter as a plurality of second lights to the reflective layer, the first light corresponding to each light emitter is temporally coherent to the reference light, and the second lights corresponding to the j-th light emitter interferes with the reference light as an interference pattern corresponding to the j-th light emitter;
    a camera, located outside of the chamber and capturing the interference pattern corresponding to each light emitter; and
    a processor, coupled with the reference light source, the at least on light emitter, and the camera and estimating an eye pose of the target eye based on the interference pattern corresponding to each light emitter.

9. The HMD according to claim 8, wherein the display is used to provide a visual content, wherein the visual content is propagated through the lens to the target eye.

10. The HMD according to claim 8, wherein the first light has a wavelength distribution, the reflective layer only scatters lights with a specific wavelength within the wavelength distribution, and the camera only captures lights with the specific wavelength.

11. The HMD according to claim 8, wherein the processor is configured to:
    input the interference pattern corresponding to each light emitter to a feature extracting model, wherein the feature extracting model extracts a plurality of 3D eye features of the target eye from the interference pattern corresponding to each light emitter; and
    obtaining the eye pose of the target eye based on the 3D eye features.

12. The HMD according to claim 11, wherein the feature extracting model comprises an encoder-decoder convolutional neural network.

13. The HMD according to claim 8, wherein the at least one light emitter is disposed around the lens.

14. The HMD according to claim 8, wherein the first light is a non-visible light.

15. The HMD according to claim 8, wherein the processor further obtains a gaze direction of the target eye based on the eye pose of the target eye.

* * * * *